(12) United States Patent
Wilson et al.

(10) Patent No.: US 6,588,290 B2
(45) Date of Patent: Jul. 8, 2003

(54) TRANSMISSION SHIFT CONTROL

(75) Inventors: Erik C. Wilson, Fort Wayne, IN (US); Trevor W. Harrison, Wyoming, MI (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 09/775,963

(22) Filed: Feb. 2, 2001

(65) Prior Publication Data

US 2002/0104399 A1 Aug. 8, 2002

(51) Int. Cl.$^7$ .......................... F16H 59/00; B60K 20/00
(52) U.S. Cl. ........................................ 74/335; 74/473.15
(58) Field of Search ................ 74/335, 473.1, 74/473.15, 473.3

(56) References Cited

U.S. PATENT DOCUMENTS

| | | | | |
|---|---|---|---|---|
| 1,736,330 A | * | 11/1929 | Schmidt | ................ 74/473.1 X |
| 2,884,802 A | * | 5/1959 | Loofbourrow | ............. 74/473.3 |
| 2,926,762 A | * | 3/1960 | Edgley | .................. 74/473.3 X |
| 3,835,491 A | * | 9/1974 | Aine | .......................... 114/344 |
| 5,085,096 A | * | 2/1992 | Behrens | ....................... 74/475 |
| 5,179,868 A | * | 1/1993 | Thibeault | .................. 74/335 X |
| 5,357,820 A | * | 10/1994 | Moroto et al. | ................. 74/335 |
| 5,842,376 A | * | 12/1998 | Dresden, III et al. | ..... 74/336 R |
| 5,887,485 A | * | 3/1999 | VanOrder et al. | ......... 74/473.15 |
| 6,082,218 A | * | 7/2000 | Osborn et al. | ....... 74/473.15 X |
| 6,124,789 A | * | 9/2000 | Barr | ........................... 340/457 |
| 6,282,975 B1 | * | 9/2001 | Harrison et al. | ........... 74/473.3 |

* cited by examiner

Primary Examiner—Charles A Marmor
Assistant Examiner—Roger Pang
(74) Attorney, Agent, or Firm—Jeffrey P. Calfa; Neil T. Powell; Dennis Kelly Sullivan

(57) ABSTRACT

A shift control is provided that pulls a cable when the handle is moved rearward. The shift control can be used as an integrated shift control for shifting the gears of an automatic transmission and actuating a park locking system. In the preferred embodiment the shift control pulls the cable in tension when a park pawl locking system is disengaged.

4 Claims, 5 Drawing Sheets

TRANSMISSION SHIFT CONTROL

FIELD OF THE INVENTION

The present invention relates generally to automotive vehicle controls, and more particularly, to a transmission control that uses a cable.

BACKGROUND

Automotive vehicles provide a number of controls which allow the driver to control the various functions of the vehicle during operation. One control that is typically provided is a shift control for the transmission. The types of transmissions that are available in the vehicle art and the corresponding controls for these transmissions are numerous. Currently, however, automatic transmissions are the most popular type of transmission used in new vehicles. As is well-known by many, automatic transmissions simplify shifting of the gear speeds in a vehicle by providing an intuitive shift pattern with a limited number of control selections for park, reverse and forward speeds. This makes driving the vehicle much easier because the driver can choose a single selection and the transmission then automatically shifts the various transmission gears based on the speed of the vehicle and the torque load on the engine.

Several different types of shift controls are generally available for automotive vehicles. In the case of automatic transmission shift controls, a shift lever is generally provided which the driver operates by moving the shift lever through a straight, inline pattern. Detents and labels are usually provided at each of the control positions so that the driver can easily make the desired selections. Desirably, the shift lever should also be located at a convenient place near the driver for easy operation. For example, in some automotive vehicles the shift lever is mounted to the cab mounted steering column of the vehicle's steering system. However, in the case of heavy-duty trucks, the shift lever is often mounted to the front instrument panel near the middle of the vehicle. In this location it is particularly desirable to provide clearance below and rearward of the shift control to allow individuals to easily move between the passenger and driver seats and to place packages on the floor below the shift control.

Designers of automotive vehicles continuously endeavor to design vehicles that are less expensive to manufacture while maintaining the performance and safety requirements that are expected by purchasers. One area in the art of heavy-duty trucks where cost reduction and improved performance is possible is the park locking system. Traditionally, heavy-duty truck manufacturers have used manually operated driveline brakes for the park locking system. In these systems, a drum brake mounted to either end of the drive shaft is operated by a separate control independent of the shift control. However, this type of park locking system is expensive and cumbersome to use since it requires a separate park locking control.

One alternative to the traditional manual drum brake system is a power assisted drum parking brake. In this type of system, the drum brake is actuated by spring force and is disengaged by pressurized air or hydraulic fluid. Since this system is usually operated by a detented hydraulic valve, the park locking control can be integrated with the shift control, thus eliminating one control. One disadvantage of this system, however, is the additional cost and complexity of the hydraulic circuitry.

Another alternative park locking system employs a park pawl locking mechanism in addition to a separate park brake. Typically, the park pawl is a pivoting arm with a number of gear teeth on one end that is installed inside the transmission. The park locking mechanism is engaged by pivoting the park pawl until the teeth are enmeshed with the teeth of one of the transmission gears, thus locking the transmission. Because the park pawl can be operated with a detented lever, the control for the park locking system can be integrated into a single shift control like the hydraulically actuated drum brake. However, unlike the hydraulically actuated drum brake, this system is considerably less expensive because the complicated hydraulic circuitry is unnecessary.

One problem with park pawl locking systems is the high forces that can be required to disengage the park pawl. Typically, this problem occurs when the vehicle rolls slightly while the park pawl is engaged. When this situation occurs, the tooth contact between the transmission gear and the teeth of the park pawl can tend to resist disengagement. Generally, this problem is exacerbated in heavy-duty trucks when they are parked on slopes because the heavy weight of the truck transfers a large amount of torque to the transmission gear. As a result, the force required to move the shift lever out of the park selection in an integrated control can be considerably higher than any of the other shift selections. Accordingly, in one example the shift lever force required to disengage the park locking system can be as high as 45 lbs., whereas the shift lever force is only about 5 lbs. for the other shift selections.

One problem with high park pawl disengagement forces is that it can cause the shift control cable to wear out and fail prematurely. The shift control cable is typically connected at one end to the cab-mounted shift control and is connected at the other end to the transmission shifting mechanisms. Accordingly, the shift control cable translates the movement of the shift lever to the transmission. Typically, cables are rated to transmit only small amounts of force while in compression to prevent premature failure of the cable. Therefore, a shift control that minimizes compressive loads on the shift control cable is desirable.

BRIEF SUMMARY

Accordingly, an integrated shift control is provided for shifting the gears of an automatic transmission and actuating a park pawl locking system. The shift control includes a lever portion attached to a handle. The lever portion is pivotally attached to the body of the shift control. One end of a cable is then pivotally attached to the lever portion between the handle and the lever portion pivotal attachment. Accordingly, the shift control pulls the cable, placing it in tension, when the handle is moved out of a park selection. Relative small forces are applied to the cable when the cable is pushed in compression, thus preventing cable overload and premature failure.

BRIEF DESCRIPTION OF SEVERAL VIEWS OF THE DRAWINGS

The invention, including its construction and method of operation, is illustrated more or less diagrammatically in the drawings, in which.

DETAILED DESCRIPTION OF THE INVENTION

Figure 1:
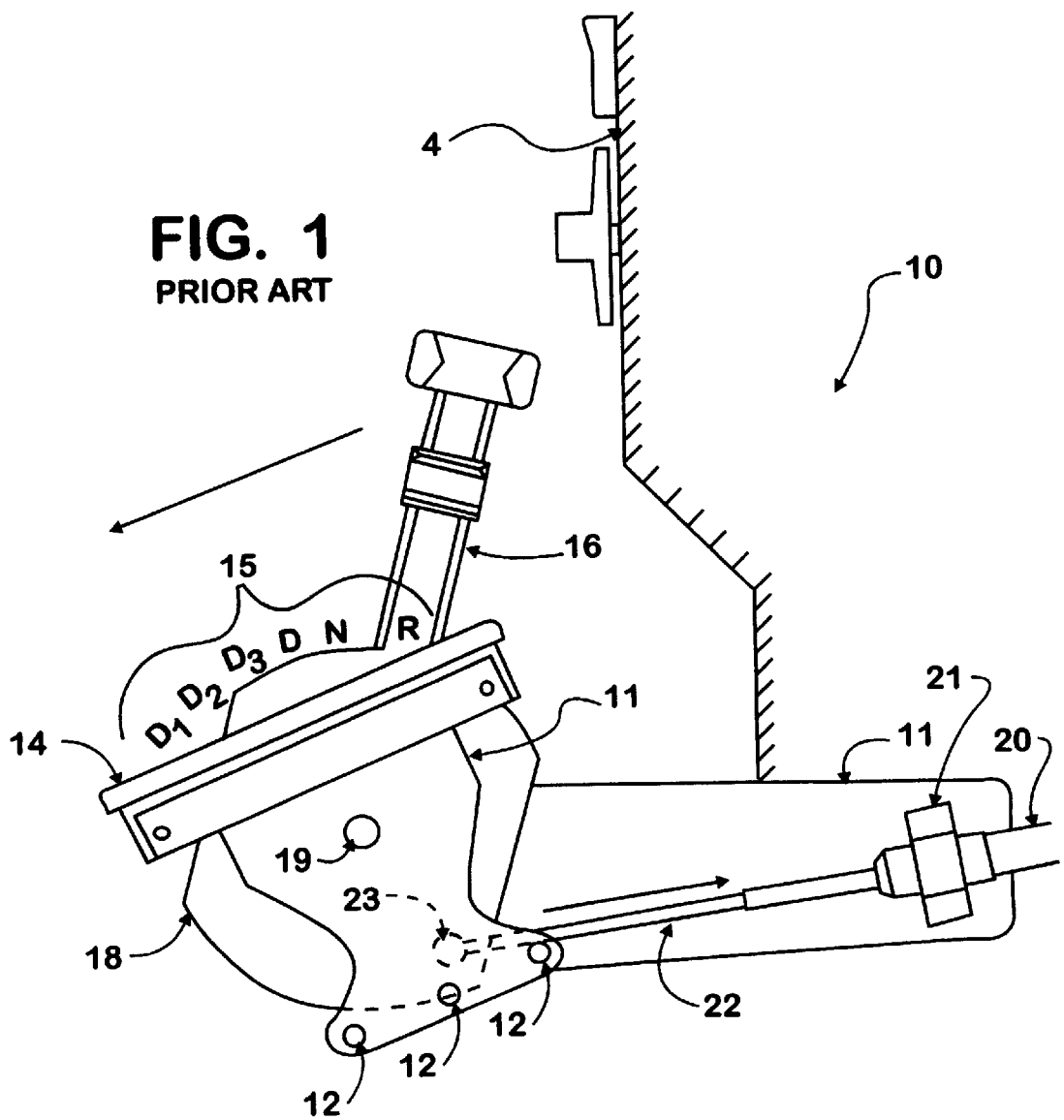
FIG. 1 is a side elevational view of a prior art shift control.

Referring now to the drawings and particularly to FIG. 1, a prior art shift control 10 for an automatic transmission 2 is shown. Shift controls like the prior art shift control 10 have been used in heavy-duty trucks to allow the driver of the truck to shift the transmission gears while sifting in the driver seat. Although the shift control 10 may be positioned in the cab of the vehicle at several different locations, the shift control 10 is often mounted near the center of the vehicle cab so that the driver can reach the control 10 with his right hand while driving. Commonly, the shift control 10 is mounted forward from the seats near the front instrument panel 4, but below the instrument panel 4 to avoid obstruction of the instrument panel 4. Mounting holes 12 are provided to attach the shift 10 control to the cab body with screws. One important advantage of this mounting position is that the area below the shift control 10 and the area between the shift control 10 and the seats remains open and unobstructed. This allows the driver and passenger to move more freely between the driver seat and passenger seat and allows packages to be placed on the floor of the cab below the shift control 10.

Figure 2:
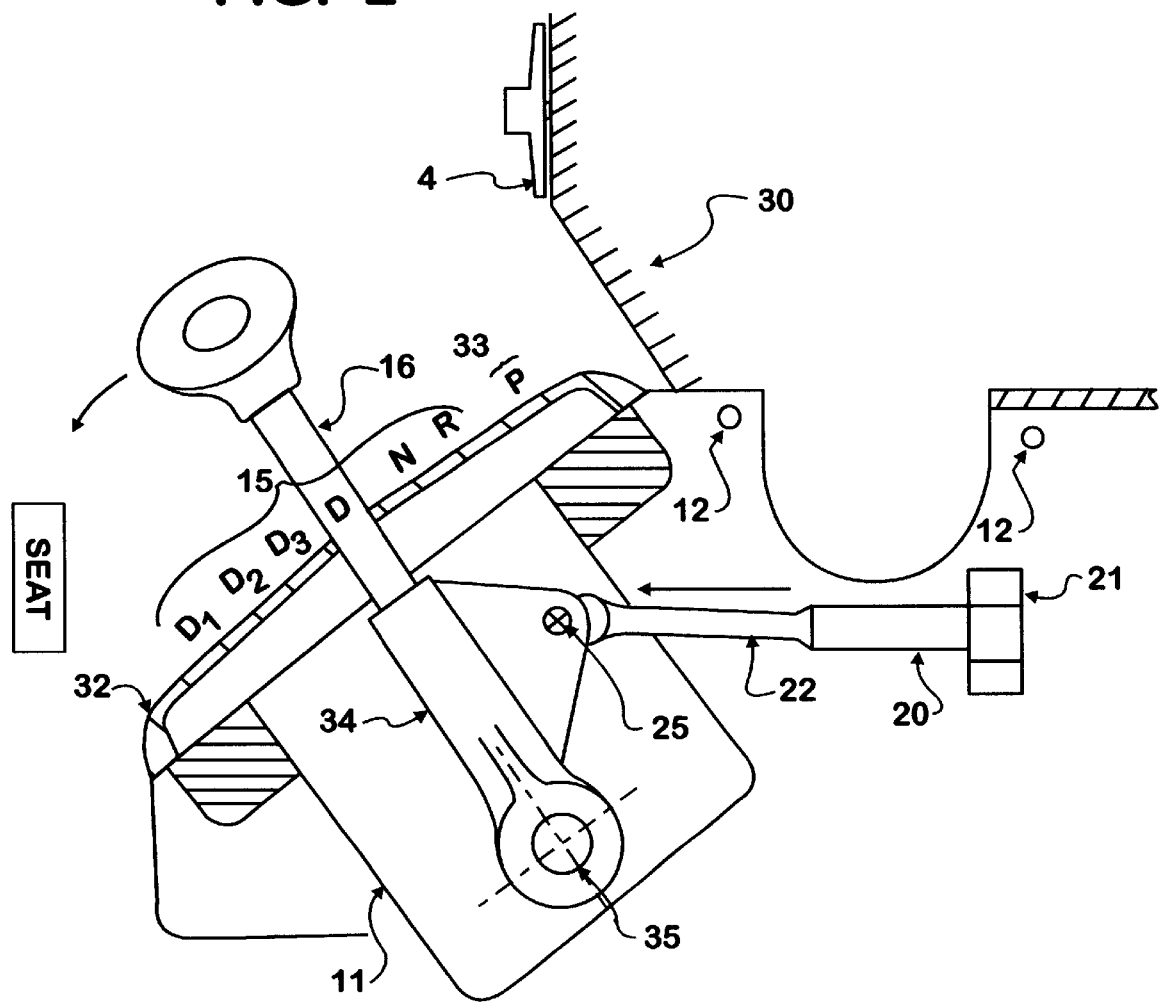
FIG. 2 is a side elevational view of an integrated shift control.

The shift control 10 usually includes a face plate 14 with a slot (not indicated) that the handle 16 extends through. To aid the driver in choosing the desired shift selections, labels 15 are provided on the face plate 14 adjacent to the slot and the handle 16. In FIGS. 1 and 2 the gear selection labels 15 are drawn above the face plate 14 to show the label locations relative to the side view of the handle 16. As is known by those in the art, industry standards and government regulations generally dictate the order of the shift selections 15 and the corresponding labels 15 for the selections 15. Accordingly, in the prior art shift control 10 shown, the reverse (R) selection 15 is located at the foremost position toward the front of the vehicle. In rearward order from the reverse (R) selection is neutral (N), automatic drive (D) and manual drive gear selections in decreasing order ($D_{4321}$, $D_{321}$, etc.) 15. As is apparent then, the driver shifts the automatic transmission 2 by moving the handle 16 forward and rearward, thus choosing the desired gear selections 15.

As previously described, the handle 16 extends through the slot in the face plate 14 and into the shift control body 11. The lower portion of the handle 16 forms a lever portion 18 that transfers the movement of the handle 16 to a cable 30. Accordingly, the lever portion 18 is pivotally attached to the shift control body 11 below the face plate 14. The first end 22 of the cable 20 is then pivotally attached 23 to the lever portion 18 below the pivotal attachment 19 of the lever portion 18 to the shift control body 11. Thus, when the handle 16 is moved between the shift selections 15, the end 22 of the cable 20 also moves, but in an opposite direction of the handle 16 movement. In FIG. 1, this opposite relationship between the handle 16 and the cable end 22 is shown with a rearward facing arrow showing the handle 16 movement and a forward facing arrow showing the resulting movement of the cable end 22.

The cable end 22 motion is then transmitted by the cable 20 to the transmission shifting mechanisms 26 to make the desired gear changes. In automatic transmissions 2 the gear shifting mechanism 26 is usually a hydraulic valve that is actuated back and forth by an exterior lever 27. The hydraulic valve then redirects oil within the transmission to initiate the gear changes. Spring detents are also usually provided to define each of the selection positions. As a result of this design, the forces which are transmitted through the cable 20 are relatively low and are usually less than 15 lbs. More specific details regarding how the cable transmits this motion to the transmission are provided below. Generally, the transmission 2 and the shifting mechanisms 26 are located underneath the cab of the vehicle. Therefore, the cable 20 must be routed from the shift control 10 so that the second end 24 of the cable 20 can be attached to the shifting mechanisms 26 below the cab. A variety of routing alternatives, which are not shown, are possible, such as routing the cable 20 straight down from the shift control 10 and through the floor of the cab. Another alternative is to route the cable 20 rearward from the shift control 10 and out the rear side of the cab. The cable 20 is then looped forward underneath the cab to attach the second end 24 to the shifting mechanisms 26. However, in the preferred routing alternative, which is shown, the cable 20 is routed forward from the shift control 10 and out the front end of the cab. The cable 20 is then looped rearward back to the transmission 2. This routing alternative is usually preferred because it leaves the areas below the shift control 10 and between the shift control 10 and the seat unobstructed.

Turning now to FIG. 2, an improved integral shift control 30 is provided for automatic transmissions 2. Because the integrated shift control 30 is similar to the prior art shift control 10, only those features that are significantly different will be described. Although the shift control 30 may be used in a variety of different vehicles, the preferred embodiment is used in heavy-duty trucks of class 7 or 8. As is well-known to those in the art, vehicles are categorized into different classes according to the load capacity of the vehicle. Thus, class 7 trucks are rated with a gross weight capacity between 26,001 lbs. and 33,000 lbs. Likewise, class 8 trucks are rated with a gross weight capacity greater than 33,001 lbs. The shift control 30 also preferably integrates control of the park locking system 40 with the gear shift control. Accordingly, a label for the park selection 33 is added to the face plate 32 of the shift control 30. In following with industry standards and government regulations, the park selection (P) 33 is located ahead of the reverse (R) selection 15 so that the park selection 33 is now the foremost gear selection. Therefore, when the driver moves the handle 16 all the way forward, the shift control 30 will lock the transmission 2 and prevent the vehicle from rolling. Correspondingly, the park locking system 40 is disengaged when the driver moves the handle 16 rearward into any of the other gear selections.

Figure 4:
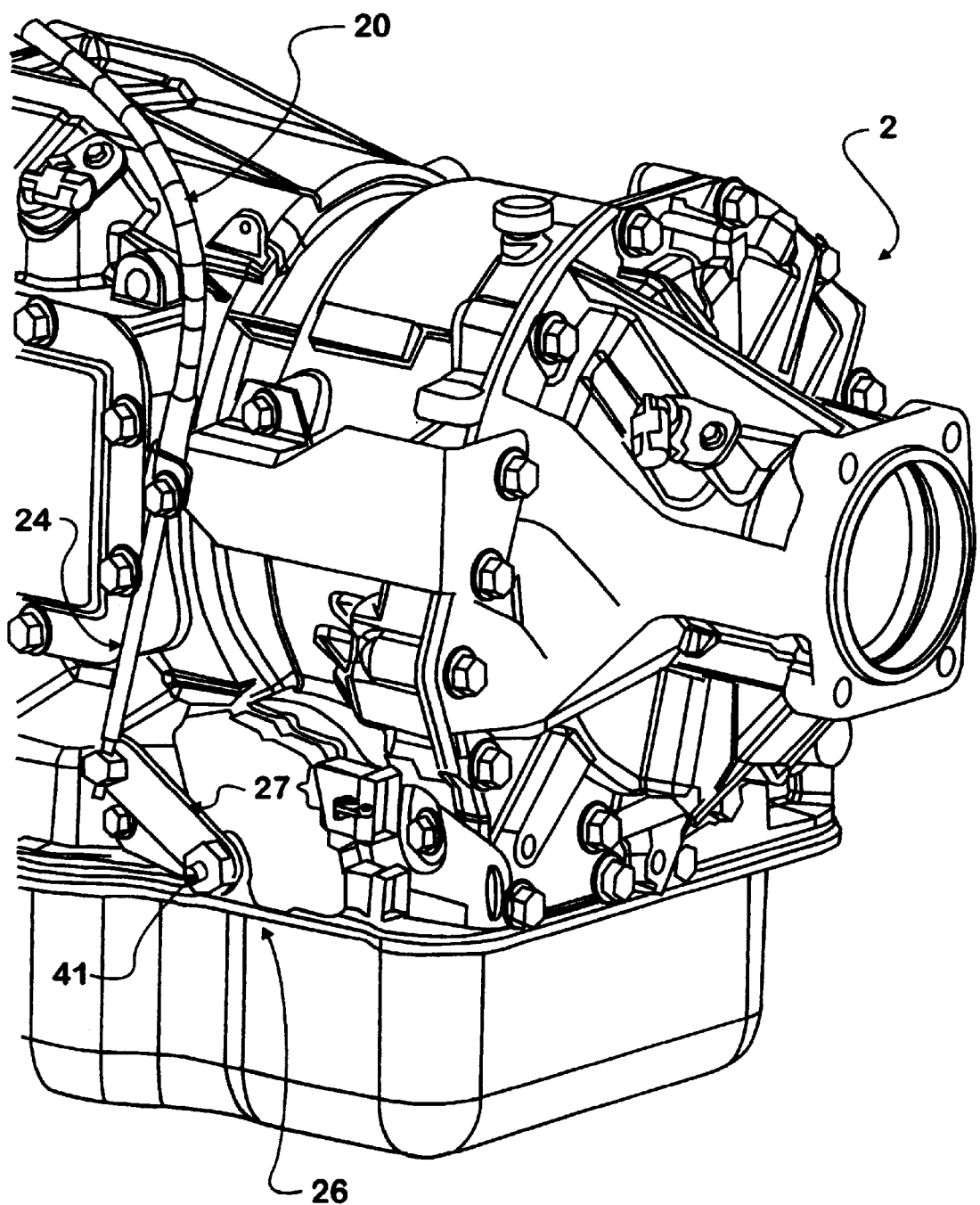
FIG. 4 is a perspective view of an automatic transmission, showing one end of the cable attached to the shifting mechanisms.
Figure 5:
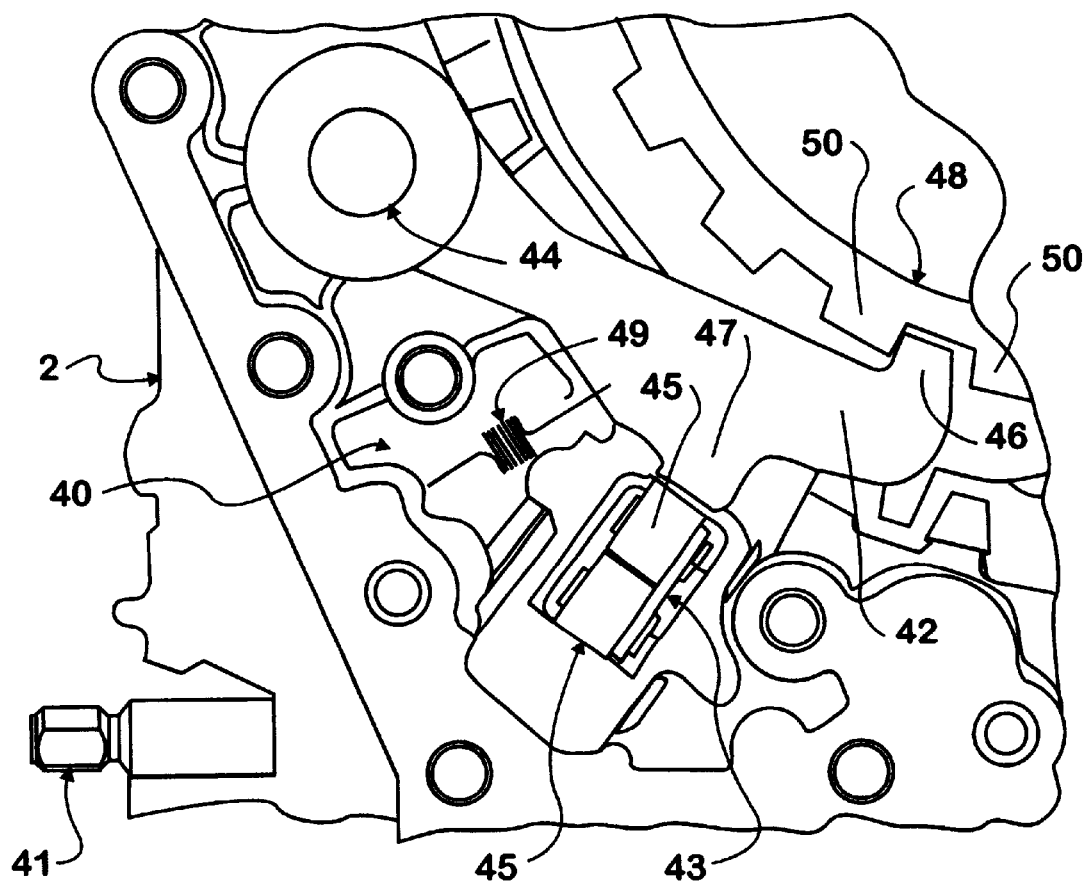
FIG. 5 is a side elevational view of a portion of the interior of the transmission, showing a park pawl arm and a transmission gear.

Turning now to FIGS. 4 and 5, a park pawl locking system 40 is used with the integral shift control 30 to provide a positive stop park locking system 40 while also reducing manufacturing costs. The park pawl locking system 40 is actuated by an external lever 27 when the second end 24 of the cable 20 is moved back and forth. The external lever 27 then rotates a control shaft 41 that is connected to shifting mechanisms within the transmission 2. Preferably, the control shaft 41 also actuates a hydraulic valve (not shown) in the transmission 2 that shifts the gears of the transmission 2. The park pawl locking system 40 includes a park pawl arm 42 that is pivotally attached 44 at one end to the housing interior of the transmission 2. At the other end of the park pawl arm 42 is a tooth 46 that is shaped to enmesh with one of the transmission gears 48. Accordingly, the park pawl locking system 40 is engaged by rotating the park pawl arm 42 until the park pawl tooth 46 engages and enmeshes with the transmission gear teeth 50. The transmission gear 48 is then prevented from rotating, thus locking the transmission 2. Conversely, the transmission 2 is unlocked by rotating the park pawl arm 42 away from the transmission gear 48 to allow the transmission gear 48 to rotate freely. Preferably, the park pawl arm 42 is rotated towards the transmission gear 48 by an actuating member 43 with rollers 45. Accordingly, the rollers 45 contact a ramped portion 47 on the park pawl arm 42 when the control shaft 41 is rotated. When the control shaft 41 is rotated in the opposite direction, the actuating member 43 and rollers 45 move away from the ramped portion 47, and a spring 49 rotates the park pawl arm 42 away from the transmission gear 48.

One problem that has been encountered with the park pawl locking system 40 is an especially high force that is sometimes required to disengage the park pawl arm 42 from the transmission gear 48. This usually occurs when a high torque is applied to the transmission gear 48 while the park pawl teeth 46 and transmission gear teeth 50 are enmeshed. The enmeshed teeth 46, 50 then exert forces against each other, which can cause the park pawl teeth 48 to become wedged in the transmission gear teeth 50, thus resisting separation of the park pawl arm 42 from the transmission gear 48. In this situation the park pawl locking system 40 is disengaged by exerting a larger than normal force on the park pawl arm 42 to pull it away from the transmission gear 48. This problem becomes proportionately worse as the torque on the transmission gear 48 is increased. Thus, it is common to encounter this problem when the vehicle is parked on a slope where gravity encourages the vehicle to roll. As a result, especially high forces have been noted in the preferred embodiment used by a class 7 or 8 truck because the heavy weight of the truck applies an especially high torque to the transmission gear 48. For example, in some applications the torque required to rotate the control shaft 41 during disengagement of the park pawl arm 42 can reach 25 ft-lb. In a typical shift control system, this usually translates into about 150 lbs. of cable compression or tension.

Figure 3:
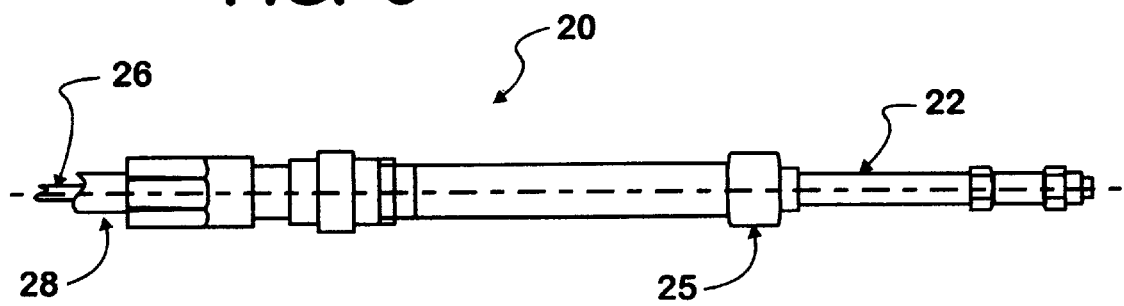
FIG. 3 is a side elevational view of one end of a cable, showing part of the cable broken away to display the construction of the cable.

Turning now to FIG. 3, it can be seen why the high forces necessary to disengage the park pawl locking system 40 can cause premature failure of the cable 20. Typical cables 20 include a core 26 that can move back and forth within an outer sheath 28. The core 26 is connected to both the first end 22 of the cable 20 and the second end 24, thus allowing the core 26 to transmit movements between the two ends 22, 24. The cable 20 is usually mounted to a rigid structure near each end 22, 24 of the cable 20 with cable mounts 21 that attach the sheath 28 to the rigid structure. Seals 25 are also usually provided at each end of the sheath 28 to prevent water and other debris from entering the interior of the cable 20. Generally, the sheath 28 and the core 26 are made from a moderately flexible material, such as wound wire or extruded plastic, to allow the core 26 to smoothly move back and forth in the sheath 28 even when the cable 20 is bent. Thus, cables 20 are particularly useful in applications like the integrated shift control 30 that require a movement to be transmitted between two places that are distant and obstructed from each other.

However, one problem with the use of cables 20 is that the cable 20 can transmit only a small force when the cable ends 22, 24 are pushed in compression. In contrast, the cable 20 can transmit a considerably higher force when the ends 22, 24 of the cable 20 are pulled in tension. This characteristic exists because of the flexible nature of the cable 20. Thus, similar to a rope that is capable of transmitting large forces in tension, the cable core 26 can withstand large tension forces without failing. On the other hand, when the cable core 26 is compressed, the core 26 tends to buckle even under relatively light loads. The sheath 28 does prevent some buckling of the core 26 by restraining the sides of the core 26; however, excessive compression loads eventually will cause the cable 20 to fail. Accordingly, in one cable example, the cable 20 is rated to accept loads as high as 230 lbs. in the pull direction, but the same cable 20 is rated to accept no more than 50 lbs. in the push direction.

Returning now to FIG. 2, one of the advantages of the integrated shift control 30 is now apparent. The lever portion 34 of the integrated shift control 30 positions the pivotal attachment 25 of the cable 20 between the handle 16 and the pivotal attachment 35 of the lever portion 34 to the shift control body 11. Accordingly, when the handle 16 of the integrated shift control 30 is moved rearward from the park selection 33 to disengage the park pawl locking system 40, the lever portion 34 pulls the first end 22 of the cable 20. The direct relationship between the movement of the handle 16 and the resulting movement of the cable end 22 is shown in FIG. 2 with rearward facing arrows at both the handle 16 and the cable end 22. As a result, the high forces that occur during disengagement of the park pawl locking system 40 are transmitted through the cable 20 while the cable 20 is in tension. On the other hand, only minimal forces are transmitted through the cable 20 when the handle 16 is moved forward, thus placing the cable 20 in compression. Therefore, the forces which are expected to be applied to the cable 20 are matched to the directional load capacity of the cable 20. In contrast, if the prior art shift control 10 was adapted to include a park pawl locking system 40, the end 22 of the cable 20 would be pushed when the handle 16 was moved rearward from the proposed park selection 33. As a result, the cable 20 would be placed in compression during the high forces required for disengagement of the park locking system 40, thus resulting in premature failure of the cable 20.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

We claim:

1. A vehicle comprising a vehicle body having a transmission; a shift control; and a cable extending between said shift control and said transmission with one end of said cable being attached to said shift control and another end being attached to said transmission; wherein said cable transmits a movement from said shift control to said transmission thereby engaging and disengaging a park locking system and wherein said movement pulls said cable in tension when said shift control disengages said park locking system, wherein said park locking system is a park pawl locking system, said park pawl locking system comprising a park pawl having a tooth adapted to enmesh with a tooth of a transmission gear, said park locking system thereby being engaged when said teeth are enmeshed and being disengaged when said teeth are not enmeshed, wherein said shift control is mounted adjacent and below an instrument panel, wherein said cable is routed from said shift control toward a front side of said vehicle, wherein said shift control includes a body defining a bottom side and a rear side of said shift control, wherein no portion of said shift control extends beyond said bottom side and said rear side, thereby providing an open area between said shift control and a floor and another open area between said shift control and a seat.

2. The vehicle according to claim 1, wherein said shift control includes a handle moveable between a foremost shift selection and a rearmost shift selection, movements of said handle corresponding to said movements transmitted by said cable and defining a number of shift selections; said shift selections being oriented in an inline pattern with a park selection corresponding to said park locking system being said foremost selection; said shift selections further including adjacent and rearward said park selection a reverse selection, a neutral selection and a drive selection in adjacent order from forward to rearward.

3. The vehicle according to claim 2, further comprising a face plate disposed along a top side of said shift control, said face plate having a slot extending through the face plate and said handle extending through said slot, wherein said shift selections are marked on said face plate with labels disposed adjacent said slot and said handle.

4. The vehicle according to claim 3, wherein said shift control comprises a lever attached to said handle, said lever being pivotally attached to said body; said cable being pivotally attached to said lever at a location between said handle and said lever pivotal attachment.

* * * * *